United States Patent [19]

Witte

[11] Patent Number: 5,125,156
[45] Date of Patent: Jun. 30, 1992

[54] PROCESS FOR SETTING BEARINGS

[75] Inventor: Dwight C. Witte, Stark County, Ohio

[73] Assignee: The Timken Company, Canton, Ohio

[21] Appl. No.: 615,124

[22] Filed: Nov. 19, 1990

[51] Int. Cl.⁵ .............................................. B23P 11/00
[52] U.S. Cl. ............................... 29/898.09; 29/407;
  29/898.061; 29/898.062; 29/898.07
[58] Field of Search .......... 29/898.09, 898.07, 898.08,
  29/898.06, 898.061, 898.062, 724, 407

[56] References Cited

U.S. PATENT DOCUMENTS

| | | | |
|---|---|---|---|
| 1,748,973 | 3/1930 | Buckwalter | 29/724 |
| 2,101,130 | 12/1937 | Christman | 384/537 |
| 2,762,112 | 9/1956 | Kylen | 29/898.07 |
| 2,911,855 | 10/1959 | Opocensky | 475/247 |
| 3,672,019 | 6/1972 | Barnbrook et al. | 29/898.09 |
| 3,695,391 | 10/1972 | Munnich et al. | 184/109 |
| 3,726,576 | 4/1973 | Barnbrook et al. | 384/563 |
| 3,785,023 | 1/1974 | Harbottle | 29/898.09 |
| 4,033,644 | 7/1977 | Reneerkens | 384/563 |
| 4,150,468 | 4/1979 | Harbottle | 29/898.09 |
| 4,179,786 | 12/1979 | Eshghy | 29/407 |
| 4,219,920 | 9/1980 | Eshghy | 29/407 |
| 4,219,921 | 9/1980 | Eshghy | 29/407 |
| 4,219,922 | 9/1980 | Eshghy | 29/407 |
| 4,492,018 | 1/1985 | Rode | 29/437 |

Primary Examiner—P. W. Echols
Assistant Examiner—David P. Bryant
Attorney, Agent, or Firm—Gravely, Lieder & Woodruff

[57] ABSTRACT

The indirectly mounted tapered roller bearings which support a pinion shaft in a differential housing are set by turning a nut at the end of the shaft down to reduce the spacing between the cones of the two bearings. Initially, the bearings exist in end play, and as the end play diminishes, the torque transmitted through the bearings from the rotating shaft to the housing is monitored. When the transmitted torque increase, signifying that the bearings have entered preload, the nut is rotated still further, through a prescribed angle relative to the shaft. Thus, the preload in the bearings is set to be a prescribed dimensional magnitude. The bearings may also be set to a prescribed condition of end play by rotating the nut in the opposite direction when the transmitted torque increases.

16 Claims, 3 Drawing Sheets

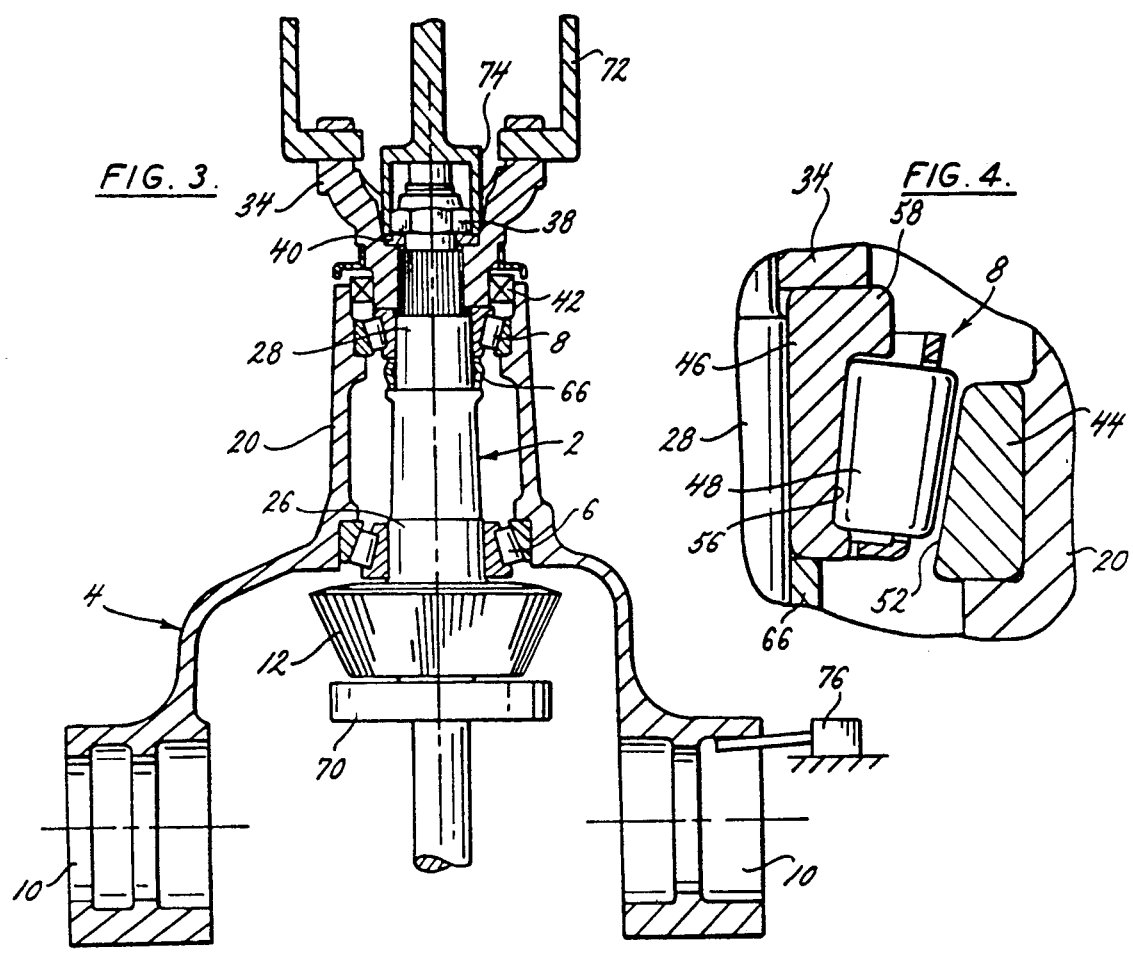
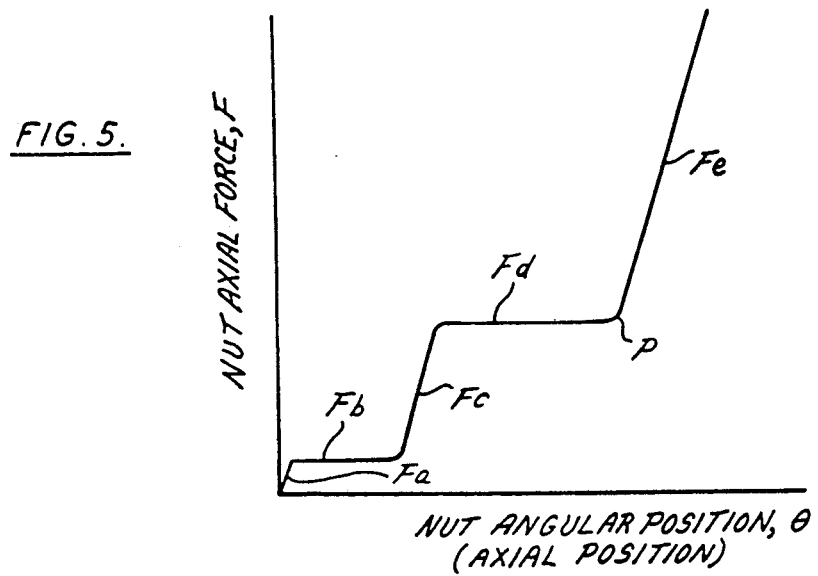

PROCESS FOR SETTING BEARINGS

BACKGROUND OF THE INVENTION

This invention relates in general to bearings and more particularly to a process for setting bearings.

In many automotive vehicles of current manufacture the engine delivers its torque through a transmission to a drive shaft which, in turn, transmits the torque to a drive axle on which the driven wheels of the vehicle are mounted. Actually, the drive shaft couples with a pinion shaft that rotates in a differential housing which forms part of the drive axle. Here, a pinion on the pinion shaft, meshes with a ring gear, and the mesh of the two gears must be proper, lest the differential will generate excessive noise and wear rapidly. In order to achieve the proper mesh, the pinion shaft is mounted in the differential housing on a pair of tapered roller bearings which are set to a condition of preload so as to eliminate all axial and radial free motion between the shaft and the housing, while still allowing rotation with minimum friction within the housing.

The preload in the bearings imparts rigidity to the shaft, but too much preload will cause the bearings to overheat and fail prematurely. On the other hand, too little preload may cause the bearings to acquire end play, and this likewise decreases the life of the bearings and introduces radial and axial play into the shaft.

Under the current procedure for adjusting the bearings of a pinion shaft, a machine rotates the shaft relative to its housing and at the same time advances a nut which confines the inner races of the two bearings. As the nut advances, the bearings go from a condition of end play to preload. By monitoring the torque transmitted from the shaft to the housing, the machine determines the desired setting and, of course, terminates the advancement of the nut when the desired torque is achieved.

But torque does not always accurately reflect preload, and indeed like bearings which transmit the same torque may exist at different conditions of preload. For example, a tapered roller bearing with finely ground end faces on its rollers and a finely ground face on the thrust rib of its cone, requires a greater preload to exhibit the same torque as a more roughly ground bearing. Thus, the machine will set premium bearings at greater preload and perhaps cause the bearings to fail in service. By the same token, light machine oils will cause the bearings to transmit more torque than heavy gear oils at typical setting speeds so a pair of bearings set while lubricated with the latter may acquire too much preload force.

The process of the present invention, like the conventional procedure, causes a nut to advance over a pinion shaft to reduce the end play in a pair of bearings. Indeed, the process monitors the torque transmitted by the bearings as the nut is advanced and detects the point at which the bearings enter a condition of preload. At this point, the nut is rotated through a prescribed angle. Thus, the setting derived is purely dimensional in character and not subject to the variables which affect torque-dependent settings.

DESCRIPTION OF THE DRAWINGS

In the accompanying drawings which form part of the specification and wherein like numerals and letters refer to like parts wherever they occur:

FIG. 3 is a sectional view of the housing and further schematically showing a machine for advancing the bearings from a condition of end play to the proper preload;

FIG. 4 is an enlarged sectional view of the outer bearing in a condition of end play;

FIG. 5 is a graphical representation showing the relationship between the axial clamping force applied to the cones of the bearing and the axial position of the cones as the bearings are brought from a condition of end play to preload.

DETAILED DESCRIPTION

Figure 1:
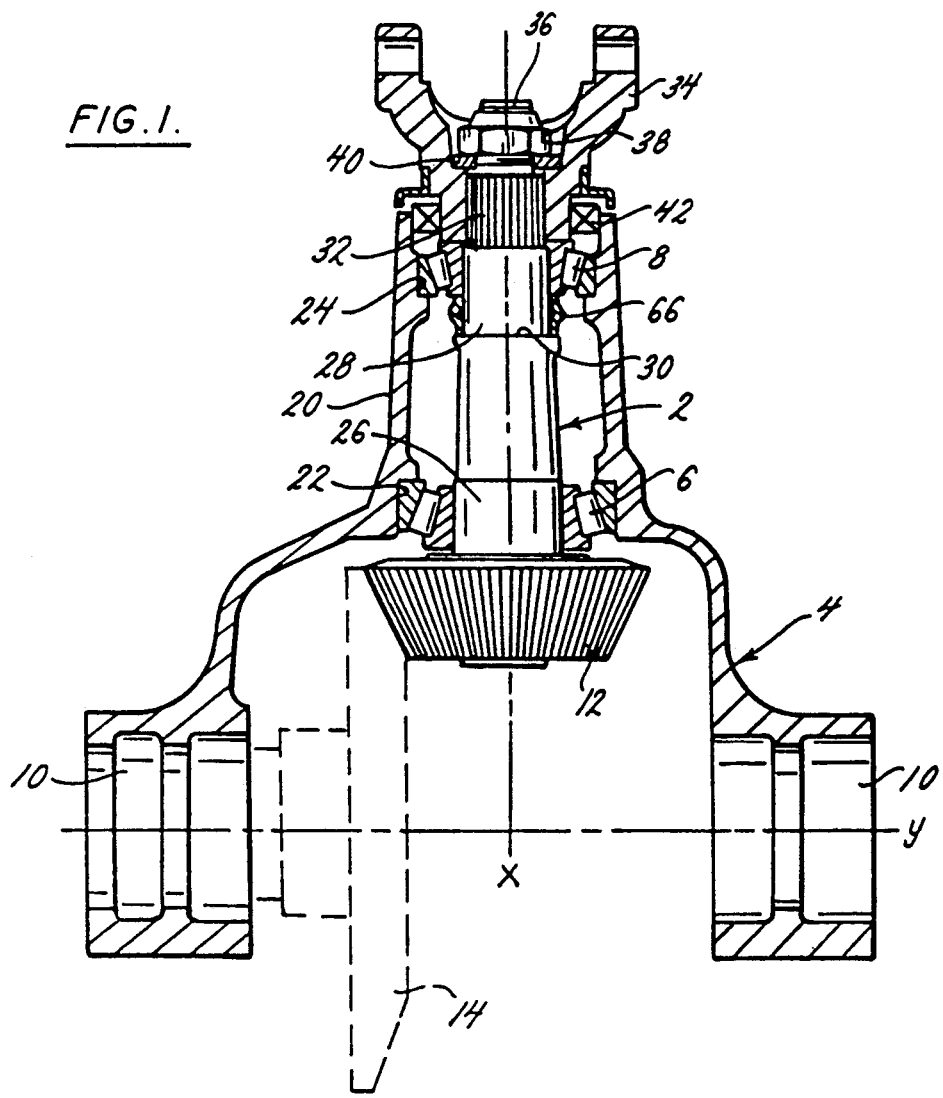
FIG. 1 is a sectional view of a housing containing a pinion shaft which is mounted on two tapered roller bearings arranged in the indirect orientation and set to a condition of preload.

Referring now to the drawings (FIG. 1), a pinion shaft 2 rotates within a differential housing 4 on inner and outer tapered roller bearings 6 and 8 which are mounted in opposition to each other along the axis x of rotation. Using the process of the present invention, the bearings 6 and 8 are set to a condition of preload, so as to impart rigidity to the shaft 2—rigidity in the sense that the shaft 2 will rotate in the housing 4 without any radial or axial play. The pinion shaft 2 serves to deliver torque from a drive shaft (not shown) to a pair of axle shafts (not shown) which extend laterally through bores 10 in the sides of the housing 4 and rotate about an axis y. To this end, the pinion shaft 2 at its inner end has a beveled pinion gear 12 which meshes with a beveled ring gear 14 in the housing 4. The ring gear 14 in turn is connected to the axle shafts through more gearing such that the axle shafts may rotate independently of each other.

Actually, the pinion shaft 2 extends through a tubular extension 20 (FIG. 1) on the housing 4, the axis of which coincides with the axis x and is perpendicular to the axis y of the ring gear 14 and the lateral bores 10. The extension, in turn, contains counterbores 22 and 24, the former of which opens inwardly into the housing 4 and the latter outwardly. The bearings 6 and 8 fit into the counterbores 22 and 24, respectively, where they are mounted in the indirect configuration or orientation. The shaft 2 adjacent to the beveled pinion gear 12 possesses an inner bearing seat 26 around which the inner bearing 6 fits and an outer seat 28 around which the outer bearing 8 fits. The outer seat 28 is considerably longer than the inner seat 26 and terminates at a shoulder 30 which is located between the two seats 26 and 28. Beyond the outer seat 28, the pinion shaft 2 has a spline 32 to which a drive flange 34 is fitted. Being on the spline 32, the flange 34, unless otherwise restrained, can shift axially along the shaft 2, but cannot rotate relative to it. The drive flange 34 is configured to accommodate a conventional universal joint and thus serves to couple the shaft 2 to a drive shaft. At its outer end, the pinion shaft 2 is provided with threads 36 over which a nut 38 is threaded. Indeed, the nut 38 is turned down against the drive flange 34 to clamp the bearings 6 and 8 between the drive flange 34 and the pinion gear 12. Actually, the nut 38 bears against a washer 40 which, in turn, bears against the drive flange 34. The extent to which the nut 38 is turned determines the setting for the bearings 6 and 8. To retain lubricant within the housing 4, the outer end of the tubular extension 20 is fitted with a seal 42 that bears against a smoothly finished surface on the drive flange 34.

Figure 2:
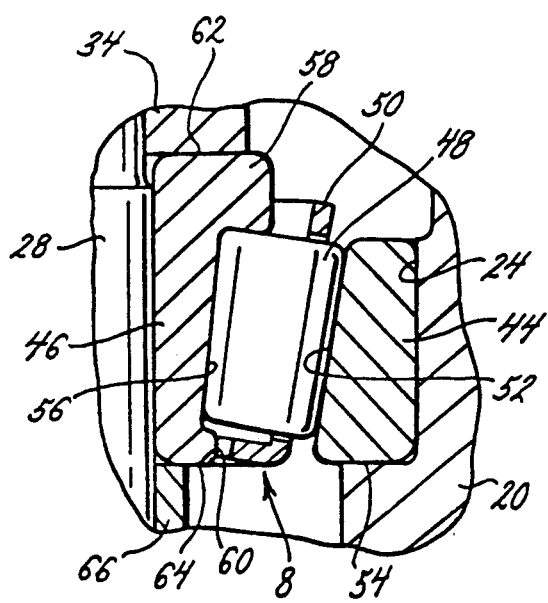
FIG. 2 is an enlarged sectional view of one of the preloaded bearings.

The inner bearing 6 is slightly larger than the outer bearing 8, but other than that the two bearings 6 and 8 are similar. Each includes (FIG. 2) an outer race or cup 44 fitted into the tubular extension 20, an inner race or cone 46 fitted over the pinion shaft 2, and rolling elements in the form of tapered rollers 48 arranged in a single row between the cup 44 and the cone 46. In addition, each bearing 6 and 8 has a cage 50 which maintains uniform spacing between its rollers 48 and retains the rollers 48 around its cone 46 when the cone 46 is withdrawn from the cup 44. More specifically, the cup 44 of each bearing 6 and 8 has a tapered raceway 52 which is presented inwardly toward the cone 46 and a back face 54 at the small diameter end of the cup raceway 52. The cone 46 has a raceway 56 which is presented outwardly toward the cup 44 as well as a thrust rib 58 at the large end of the raceway 56 and a retaining rib 60 at the small end. The cone 46 also has a back face 62 on the thrust rib 58 and a front face 64 at the retaining rib 60. The rollers 48 fit between the raceways 52 and 56 of the cup 44 and cone 46, respectively, and indeed at their tapered side faces bear against the raceways 52 and 56. The large end faces of the roller 48 bear against the thrust rib 58. The arrangement is such that the rollers 48 are on apex, meaning that if the raceways 52 and 56 and the side faces of the rollers 48 were extended to their respective apicies, those apicies would lie at a common point along the axis x of rotation.

The cup 44 of the inner bearing 6 fits into the counterbore 22 at the inner end of the tubular extension 20 on the housing 4, with its back face 54 being presented toward the outer bearing 8 (FIG. 1). Indeed the back face 54 is against a shoulder at the end of the counterbore 22. The fit is tight, that is an interference fit exists between the cup 44 and the surface of the counterbore 22. The cone 46 of the inner bearing 6 fits over the inner bearing seat 26 on the pinion shaft with its back face 62 presented toward the pinion gear 12. That back face 62 may bear directly against the end face of the gear 12 or it may bear against a shim interposed between the back face 62 and the gear 12, but in either case the cone 46 of the inner bearing 6 serves to establish the axial position of the gear 12 within the housing 4. An interference fit exists between the cone 46 and the bearing seat 26. The rollers 48 of the inner bearing 6 lie in a circle or single row between the raceways 52 and 56 of the cup 44 and cone 46 for that bearing.

The cup 44 of the outer bearing 8 fits tightly into the outer counterbore 24, but its back face 54 is presented in the opposite direction toward the interior of the housing 4 (FIG. 1). The back face 54 bears against a shoulder at the end of the counterbore 24. The cone 46 of the outer bearing 8 fits snugly over the outer bearing seat 28 with its back face 62 presented outwardly, that is away from the pinion gears 12 and toward the threads 36. While an interference fit exists between the cone 46 and the bearing seat 28, the fit is not so tight as to prevent the cone 46 from advancing over the seat 28 under a force exerted by the nut 38 as the nut 38 is turned down over the threads 36.

Not only will the rotation of the nut 38 overcome the friction between the cone 46 and the seat 28, but it further causes the collapse of a spacer 66 (FIG. 1) which is located around the remaining portion of the seat 28 between the shoulder 30 and the front face 64 of the cone 46. The rollers 48 of the bearing 8 are of course interposed between the raceway 52 and 56 of the cup 44 and cone 46, respectively, with their large end faces presented away from the pinion gear 12.

While the nut 38 serves to advance the cone 46 of the outer bearing 8 over the outer bearing seat 28 on the pinion shaft 2, it does not bear directly against the cone 46, but instead exerts its force through the drive flange 34 which is captured between the nut 38 and the cone 46. Indeed, the drive flange 34 bears against the back face 62 of the cone 46 for the outer bearing 8. Initially, before adjustment, the bearings 6 and 8 exist in a state of end play in which the pinion shaft 2 can move both axially and radially with respect to the housing 4 and, of course, rotate as well (FIG. 4). As the nut 38 is turned down over the thread 36 at the end of the shaft 2, it forces the drive flange 34 further along the spline 32, and the drive flange 34, in turn, forces the cone 46 of the outer bearing 8 along the outer bearing seat 28 of the pinion shaft 2. After a short distance the cone 46 encounters the spacer 66 which now becomes snugly lodged between the front face 64 of the cone 46 and the shoulder 30 at the end of the seat 28. As the advancement continues, still while the bearings 6 and 8 are in a condition of end play, the spacer 66 collapses. In time, the rollers 48 of the two bearings 6 and 8 seat against the raceways 52 and 56 of their respective cups 44 and cones 46, with their large end faces bearing against the thrust ribs 58 of their cones 46. This represents a condition of zero end play-a conditiion in which the shaft 2 cannot shift axially or radially with respect to the housing 2. But some preload is usually desired to insure adequate rigidity or stiffness in the pinion shaft 2 and desired performance from the gears 12 and 14. Hence, the preload setting for the bearings 6 and 8.

Before adjusting the bearings 6 and 8 to a condition of preload, the pinion shaft 2 must be installed in the housing 4. To this end, the cups 44 of the bearings 6 and 8 are pressed into their respective counterbores 22 and 24 in the tubular extension 20 of the housing 4 until their back faces 54 come against the shoulders at the ends of those counterbores 22 and 24. Also, the cone 46 of the inner bearing 6 is passed over the pinion shaft 2 and pressed onto the inner bearing seat 26 until its back face 62 comes against the end of the pinion gear 12 or against a shim located along that back face. The inner bearing 6 and the shim, if used, position the pinion gear 12 so that it will mesh properly with the ring gear 14. Next the pinion shaft 2 is passed through the housing 4 and into the extension 20 with its threaded end leading. It is advanced until the cone 46 and rollers 48 of the inner bearing 6 fit into the cup 44 of that bearing. Thereupon, the collapsible spacer 66 and the cone 46 for the outer bearing 8 are fitted in that order over the outer bearing seat 28. The spacer 66 fits easily over the seat 28 and against the shoulder 30, but by reason of the interference fit, the cone 46 requires some force to expose enough of the spline 32 to accommodate the drive flange 34. However, before the drive flange 34 is installed, the seal 42 is pressed into the end of the tubular extension 20 for the housing 4. Finally, the nut 38 is threaded over the threads 36 at the outer end of the pinion shaft 2 and turned down against the washer 40 and underlying drive flange 34. The bearings 6 and 8 in this state of assembly exist in a condition of end play—indeed, end play so excessive that the shaft 2 and its pinion gear 12 could not be expected to operate properly.

With the shaft 2, housing 4, bearings 6 and 8, and drive flange 34 so assembled, the shaft 2 is placed in an upright condition, with its pinion gear 12 presented downwardly. Indeed, the pinion gear 12 rests on a rotatable support 70 that is small enough to fit into the housing 4 from the open back of the housing 4 (FIG. 3). The housing 4 now finds its support in the shaft 2, that is to say, the weight of the housing 4 is now transferred through the inner bearing 6 to the shaft 2. A few rotations of the shaft 2 cause the rollers 48 of the bearing 6 to properly seat along the raceways 52 and 56 of the cup 44 and cone 46, respectively, with the large end faces of the rollers 48 being against the thrust rib 58 for the cone 46. All of the end play now appears in the outer bearing 8 (FIG. 4).

With the pinion shaft 2 and housing 4 so supported, the drive flange 34 is coupled with a drive head 72 (FIG. 3) which rotates the shaft 2 clockwise, preferably between 30 and 100 rev/min. The nut 38, on the other hand, is engaged with a socket 74 which rotates in the same direction at a slightly greater angular velocity. For example, the differential in speed may range between 1 and 5 rev/min. The housing 4 is restrained by a torque sensor 76 which fits into one of the lateral bores 10, and the torque sensor 76 monitors the magnitude of the torque that is transmitted from the rotating shaft 2 through the bearings 6 and 8 to the housing 4. Machines having the foregoing components and capabilities are manufactured by Trio Tool Company of Livonia, Mich.

As the nut 38 rotates relative to the rotating pinion shaft 2, it drives the drive flange 34 downwardly over the spline 32 of the shaft 2, and the drive flange 34, in turn, forces the cone 46 of the outer bearing 8 farther over the outer bearing seat 28 of the shaft 2. The magnitude of the force exerted by the nut 38 in relation to the axial position of the nut 38, which is of course dependent on its angular position, may be represented graphically (FIG. 5). Initially, the axially directed force exerted by the nut 38 undergoes a slight increase in magnitude Fa as the cone 46 passes fully onto the outer bearing seat 28. The axial force then remains at an essentially constant magnitude Fb as cone 46 moves over the seat 28 toward the spacer 66. Once the front face 64 of the cone 46 contacts end of the spacer 66, the force undergoes another rise in magnitude Fc which represents the elastic deformation of the spacer 66. Then the axial force remains at an essentially constant magnitude Fd with further rotation of the nut 38 as the spacer 66 undergoes plastic deformation. These variations in the force along with their relative magnitudes may be detected by monitoring the torque applied to the nut 38 through the socket 74. As these changes in magnitude appear, the torque monitored by torque sensor 76 remains essentially constant and indeed reflects primarily the torque transmitted by the inner bearing 6, that is the lower of the two bearings 6 and 8, under the weight of the housing 4, and by the seal 42.

The generally constant axial force of magnitude Fd, which represents the plastic deformation of the spacer 66, and the constant torque remain as long as the condition of end play exists, but in time the nut 38 drives the rollers 48 of the upper or outer bearing 8 snugly between the raceways 52 and 56 of the cup 44 and cone 46, respectively, of that bearing. The rotation of the shaft 2, moreover, causes the rollers 48 to migrate up the taper of the raceways 52 and 56 until their large end faces bear against the thrust rib 58 for the cone 46. In short, the rollers 48 of the outer bearing 8 seat against the raceways 52 and 56 and the thrust rib 58 for that bearing. The initial contact of the rollers 48 against the raceways 52 and 56 of the outer bearing 8 is reflected in a slight increase P in the axial force and in the torque monitored by the torque sensor 76. The full seating of the rollers 48 and thrust rib 58 for the bearing 8 causes a substantial increase in the magnitude Fe of axial force as well as a substantial increase in torque transmitted to the housing 4, for after all, it represents the entry of the bearings 6 and 8 into a condition of preload. If the torque on the housing 4 were monitored beyond that point with the torque sensor 76, it would show a substantial increase, and indeed in the current procedure used to adjust such bearings, the socket 74 continues to turn nut 38 until the torque sensor 76 registers a prescribed torque.

Figure 6:
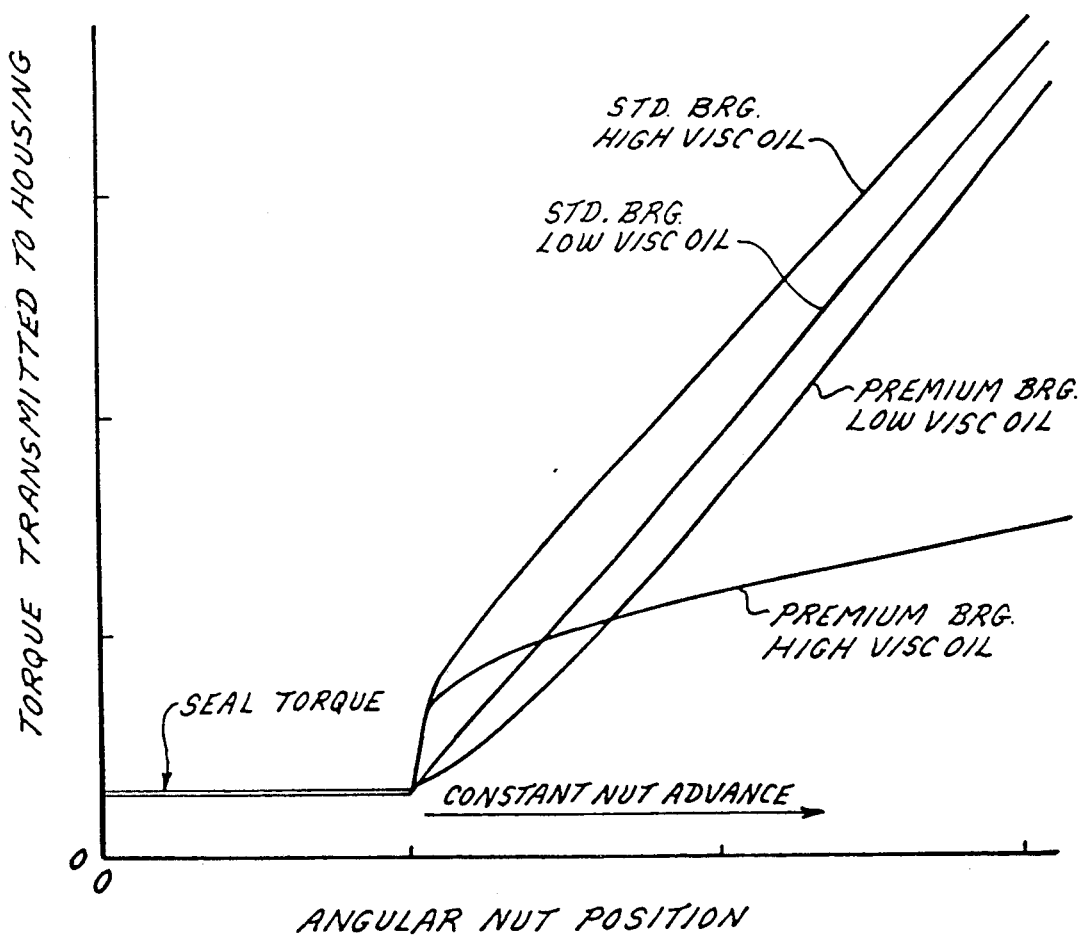
FIG. 6 is a graphical representation showing the relationship between torque transmitted through the bearings at various conditions of preload with different surface finishes and lubricants.

Actually, the torque transmitted to the housing 4 as the nut 38 is turned down into the preload zone depends on the surface finish on the large ends of the rollers 48 and on the inside surfaces of the thrust ribs 58 for the cones 46 and also on the lubricant used in the bearings 6 and 8. These variations may be represented graphically by plotting the torque applied to the housing 4 against the angular advancement of the nut 38 (FIG. 6) for bearings 6 and 8 having different finishes and lubricants. Irrespective of the finish or lubricant, all bearings 6 and 8 of equivalent size transmit essentially the same torque up to the point P where the rollers 48 for the outer bearing 8 seat against the raceways 52 and 56 of its cup 44 and cone 46, respectively. Indeed, much of this transmitted torque to point P may be attributed to the seal 42. At point P standard bearings with high viscosity oil and premium bearings with high viscosity oil display a pronounced increase in transmitted torque with advancement of the nut 38, and for the initial increment of advance that increase is of about the same magnitude for both. Thereafter, the torque transmitted in the standard bearings increases at a relatively high rate, whereas the torque transmitted by the premium bearings, which have better finishes on the ends of their rollers 48 and thrust ribs 58, increases at a significantly lesser rate. Thus, if one were to rely on the transmitted torque specified for a pair of standard bearings 6 and 8 to set the preload of premium bearings 6 and 8 lubricated with high viscosity oil, the premium bearings 6 and 8 would be set with excessive preload. By the same token, both standard and premium bearings 6 and 8 with low viscosity oil have different torque transmitting characteristics than premium bearings 6 and 8 with high viscosity oil.

In the process of the present invention, the socket 74 rotates the nut 38 relative to the shaft 2 up to the point P at which the torque sensor 76 detects a sudden rise in torque transmitted to the housing 4. That, of course, occurs when the rollers 48 of the outer bearing 8 seat against the raceways 52 and 56 of the cup 44 and cone 46 and the thrust rib 58 of the cone 46. In short, the socket 74 continues to advance the nut 38 over the thread 36 of the pinion shaft 2 until the bearings 6 and 8 enter a condition of preload. At that point P, the amount of torque detected becomes inconsequential. Instead of setting the bearings 6 and 8 to a prescribed torque, the socket 74 simply advances the nut 34 through a prescribed angle relative to the shaft 2. In other words, once the bearings 6 and 8 move from zero end play into preload, the magnitude of the preload is established dimensionally which is much more accurate than indirectly determining it by measuring torque.

The process permits premium bearings with finely ground or honed surfaces to be set with considerable precision, so that they are not excessively stressed under preload. The same holds true with bearings containing light machine oils. Indeed, factors such as surface finish and lubrication have no effect on the setting.

While the process of setting the bearings 6 and 8 will impart preload, it may also be used to achieve end play. In particular, once the sensor 76 detects point P where the rollers 48 of the bearings 6 and 8 become seated, the socket 74 rotates in the opposite direction through a prescribed angle, thereby backing the nut 38 away from the drive flange 34. Both the flange 34 and the adjacent cone 46 of the outer bearing 8 are then retracted. Again the setting is achieved dimensionally.

This invention is intended to cover all changes and modifications of the example of the invention herein chosen for purposes of the disclosure which do not constitute departures from the spirit and scope of the invention.

What is claimed is:

1. A process for setting a pair of bearings which support a shaft in a housing and are mounted in opposition, initially in a condition of end play, each bearing having a first race in the housing and a second race on the shaft, said process comprising: causing relative rotation between the shaft and housing; monitoring torque transmitted between the shaft and housing as a result of the rotation; reducing the end play in the bearings while monitoring the transmitted torque; and when the transmitted torque increases, thus indicating that the end play has been eliminated and the bearings have reached the onset of preload, changing the axial spacing between like races of the two bearings a prescribed distance to impart a desired setting to the bearings.

2. The process according to claim 1 wherein the spacing between the like races is controlled by a nut, and the step of changing the spacing comprises turning the nut through a prescribed angle relative to the shaft.

3. The process according to claim 1 wherein the like races are the second races.

4. The process according to claim 1 wherein the second race of one of the bearings is against a stop on the shaft and the position of the second race of the other bearing is controlled by a nut threaded over the shaft; and wherein the step of reducing the end play includes turning the nut relative to the shaft such that it causes the second race of said other bearing to move toward the second race of said one bearing.

5. The process according to claim 4 wherein the step of changing the spacing includes rotating the nut through a prescribed angle relative to the shaft once the transmitted torque increases.

6. A process for setting two single row antifriction bearings which support a shaft in a housing and are configured to accommodate both radial and axial loads, each bearing having an outer race that is mounted in a fixed position in the housing, an inner race that is mounted on the shaft, and rolling elements that are located in a single row between the outer and inner races, the bearings being mounted in opposition so that one takes axial loads in one direction and the other takes axial loads in the opposite direction, the shaft locating the inner race of the one bearing in a fixed axial position on the shaft and having a screw thread and a nut which locates the inner race of the other bearing on the shaft, the nut initially being backed off so that the bearings are in a condition of end play; said process comprising: rotating the shaft relative to the housing; rotating the nut relative to the shaft such that the inner race of said other bearing moves toward the inner race of said one bearing and the end play in the bearings diminishes; monitoring the torque transmitted from the shaft to the housing to detect when the bearings enter preload; and when the bearings enter preload, rotating the nut through a prescribed angle relative to the shaft to advance the inner race of said other bearing still farther toward the inner race of said one bearing, whereby the preload is set to a desired dimensional magnitude.

7. The process according to claim 6 wherein a collapsible spacer exists around the shaft between the inner races of the two bearings, and the spacer is collapsed as the nut rotates relative to the shaft to reduce end play and impart preload.

8. The process according to claim 7 wherein each bearing is a single row tapered roller bearing.

9. A process for setting inner and outer single row tapered roller bearings which support a pinion shaft in a differential housing, each bearing having a cup that is mounted in a fixed position in the housing, a cone that is mounted on the shaft, and tapered rollers arranged in a single row between the cup and cone, the bearings being oriented such that the small ends of the rollers for the two bearings are presented toward each other, the shaft having a pinion gear at its one end and threads at its other end, the cone of the inner bearing being located in a fixed position on the shaft with respect to the pinion gear, the cone of the outer bearing being shiftable axially on the shaft with its axial location determined by a nut threaded over the screw threads of the shaft, the nut initially being backed off sufficiently to place the bearings in end play; said process comprising: rotating the shaft relative to the housing; rotating the nut relative to the shaft such that the cone of the outer bearing is moved toward the cone of the inner bearing, whereby the end play in the bearings is decreased; monitoring the torque transmitted from the shaft to the housing to detect when the torque undergoes an increase, signifying that the bearings have reached the onset of preload; and when the bearings reach the onset of preload, rotating the nut through a prescribed angle relative to the shaft, whereby the setting in the bearings is set to a desired dimensional magnitude.

10. The process according to claim 9 wherein a collapsible spacer exists around the shaft and is positioned such that it is collapsed axially as the cone of the outer bearing is advanced toward the cone of the inner bearing.

11. A process for setting first and second bearings which support a first machine component, such as a shaft, in a second machine component, such as a housing, each bearing including an inner race on the first machine component and an outer race on the second machine component and rolling elements arranged in a single row between the races, the races and rolling elements of each bearing being configured to carry radial loads and to also carry axial loads in only one axial direction, the bearings being mounted in opposition so that one bearing carries axial loads in one direction and the other bearing carries axial loads in the opposite direction, the bearings further initially being in a condition of end play, said process comprising: causing relative rotation between the machine components;

monitoring torque transmitted between the machine components during the relative rotation; moving a race of one of the bearings axially with respect to the like race of the other bearing to reduce the end play in the bearings, all while monitoring the transmitted torque; and when the transmitted torque exhibits an increase which indicates that end play within the bearings has been eliminated and that the bearings have reached the onset of preload, moving a race of one of the bearings a prescribed axial distance with respect to the machine component on which it is mounted to impart a desired setting to the bearings.

12. The process according to claim 11 wherein a nut threads onto one of the machine components and controls the axial position of the race which is moved a prescribed distance to impart a desired setting, and the desired setting is imparted by rotating the nut through a prescribed angle relative to the machine component onto which it is threaded.

13. The process according to claim 12 wherein the rolling elements of said other bearing are seated along the races of that bearing during the steps of causing relative rotation between the machine components and moving a race axially while monitoring transmitted torque.

14. The process according to claim 12 wherein the nut is rotated relative to the machine component onto which it is threaded to move the race of one of the bearings axially with respect to the like race of the other bearing to reduce end play.

15. The process according to claim 14 wherein the race which is moved axially to reduce end play while the torque is monitored is the same race which is moved axially a prescribed distance to impart the desired setting.

16. The process according to claim 15 wherein the race which is moved axially is on the first machine component and the nut threads over the first machine component.

* * * * *